(12) United States Patent
Moore

(10) Patent No.: US 10,494,855 B2
(45) Date of Patent: Dec. 3, 2019

(54) POLICE AND MILITARY EQUIPMENT RACK

(71) Applicant: Title Ten Manufacturing, Muncie, IN (US)

(72) Inventor: Robert Moore, New Castle, IN (US)

(73) Assignee: Newco Title Ten LLC, Muncie, IN (US)

( * ) Notice: Subject to any disclaimer, the term of this patent is extended or adjusted under 35 U.S.C. 154(b) by 0 days.

(21) Appl. No.: 16/180,059

(22) Filed: Nov. 5, 2018

(65) Prior Publication Data

US 2019/0178020 A1    Jun. 13, 2019

Related U.S. Application Data

(63) Continuation of application No. 15/446,068, filed on Mar. 1, 2017, now abandoned.

(60) Provisional application No. 62/301,794, filed on Mar. 1, 2016.

(51) Int. Cl.
| | |
|---|---|
| *E05G 1/00* | (2006.01) |
| *A47B 61/00* | (2006.01) |
| *A47G 25/06* | (2006.01) |
| *F16M 11/22* | (2006.01) |
| *F16M 13/02* | (2006.01) |
| *A47B 81/00* | (2006.01) |

(52) U.S. Cl.
CPC ............ *E05G 1/005* (2013.01); *A47B 61/003* (2013.01); *A47G 25/0671* (2013.01); *F16M 11/22* (2013.01); *F16M 13/02* (2013.01); *A47B 81/005* (2013.01); *F16M 2200/08* (2013.01)

(58) Field of Classification Search
CPC .. A47G 25/0664; A47G 25/746; A47G 29/08; A47G 25/0671; A47G 25/0685; A47B 61/003; A47B 61/00; A47B 61/02; A47B 81/005; E05G 1/005; F16M 11/22; F16M 13/02; F16M 2200/08; A47F 7/19; A47F 7/24; A47F 7/26; A47F 8/00; A47F 5/04; A47F 7/00; A47F 5/135; A47F 5/05; A47F 5/0025; D06F 57/04
USPC ......... 211/85.3, 13.1, 197, 133.4, 26.2, 196; 248/89

See application file for complete search history.

(56) References Cited

U.S. PATENT DOCUMENTS

| | | | | |
|---|---|---|---|---|
| 355,924 | A * | 1/1887 | Favel ..................... | B65H 75/36 248/89 |
| 357,554 | A * | 2/1887 | Goodrich et al. ..... | F16M 11/00 248/158 |

(Continued)

*Primary Examiner* — Jennifer E. Novosad
(74) *Attorney, Agent, or Firm* — Woodard, Emhardt, Henry, Reeves & Wagner, LLP

(57) ABSTRACT

An equipment stand for storing police and/or military clothing and equipment may include a base; at least one upright extending upward from the base; a belt hanger supported by the upright and effective for holding an equipment belt; a vest hanger supported by the upright and effective for holding an equipment vest; a tray supported by the upright and effective for holding miscellaneous objects that do not need to be secured; and a lock box supported by the upright and effective for holding miscellaneous objects that may need to be secured. The stand may include an upright extension for holding one or more clothing hangers. The stand may be freestanding, or may be used without the base when mounted to a wall.

3 Claims, 16 Drawing Sheets

(56) References Cited

U.S. PATENT DOCUMENTS

| | | | | |
|---|---|---|---|---|
| 898,263 | A * | 9/1908 | Rice | A47G 1/16 248/474 |
| 1,386,775 | A * | 8/1921 | Fulford | A47G 25/06 211/35 |
| 1,804,069 | A * | 5/1931 | Stover | A47G 25/0671 211/1 |
| D156,022 | S * | 11/1949 | Mannheimer | D6/318 |
| 3,126,237 | A * | 3/1964 | Kirk | A47G 25/0671 108/26 |
| 3,144,940 | A * | 8/1964 | Barnett | A47G 25/0671 211/1 |
| D300,289 | S * | 3/1989 | Walter | D6/681.2 |
| D301,094 | S * | 5/1989 | Muxlow | D6/681.1 |
| 5,628,551 | A * | 5/1997 | Block | A47B 81/00 297/126 |
| 5,699,987 | A * | 12/1997 | Romaneschi | A62C 33/04 137/355.16 |
| 6,073,783 | A * | 6/2000 | Allman | D06F 59/02 211/85.3 |
| 6,102,216 | A * | 8/2000 | Frank | A47B 61/00 211/126.15 |
| 6,749,073 | B2 * | 6/2004 | McNab | A47G 25/0671 211/205 |
| 6,978,904 | B1 * | 12/2005 | Lam | A47G 25/0671 211/1 |
| 8,042,699 | B2 * | 10/2011 | Leichter | G02B 6/4457 211/26.2 |
| 8,210,365 | B2 * | 7/2012 | Van Wyk | A47B 81/00 211/85.3 |
| 8,393,482 | B2 * | 3/2013 | Durham | A47L 23/205 211/182 |
| 8,418,860 | B2 * | 4/2013 | Rimmer | D06F 57/08 211/196 |
| 8,910,560 | B2 * | 12/2014 | Irwin | F41A 23/005 211/4 |
| 2002/0144961 | A1 | 10/2002 | McNab | |
| 2007/0051686 | A1 * | 3/2007 | Sausman | D06F 57/06 211/85.3 |
| 2007/0278365 | A1 * | 12/2007 | Jackson | A47B 83/00 248/176.1 |
| 2009/0071922 | A1 * | 3/2009 | Barra | F16M 11/28 211/85.3 |
| 2011/0036794 | A1 * | 2/2011 | Schott | A47G 25/0671 211/85.3 |
| 2013/0082016 | A1 * | 4/2013 | Arrow | A47G 25/0671 211/85.1 |
| 2013/0126453 | A1 * | 5/2013 | Flickinger | A47F 7/00 211/85.3 |
| 2014/0262659 | A1 * | 9/2014 | Hirsch | A47B 61/06 190/13 R |
| 2014/0284291 | A1 * | 9/2014 | Sandgrund | A47G 25/06 211/85.3 |
| 2016/0238337 | A1 * | 8/2016 | Hull | B60R 7/14 |
| 2017/0251854 | A1 * | 9/2017 | Moore | F16M 11/22 |

* cited by examiner

POLICE AND MILITARY EQUIPMENT RACK

FIELD OF THE INVENTION

The present invention relates generally to valet stands for clothing, and more particularly to a stand for organizing and storing the clothing, equipment, and accessory items used by military and/or law enforcement personnel.

BACKGROUND TO THE INVENTION

Law enforcement and military personnel typically have multiple uniform and equipment pieces that must be kept organized for quick access. Some of the equipment may need to be kept securely.

A variety of clothing valet stands and equipment storage racks are known. These prior art stands are not effective for providing sturdy, secure, and efficient storage of the various uniform and equipment pieces that police and military personnel commonly use.

A need therefore exists for an improved uniform and equipment stand for police and military personnel. The present invention addresses that need.

SUMMARY OF THE INVENTION

Figure 1:
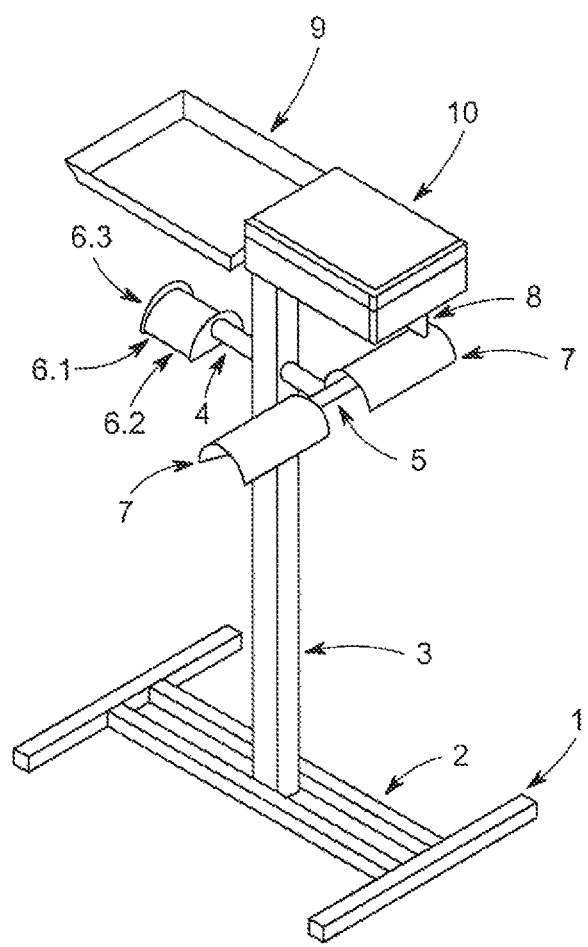
FIG. 1 shows an equipment rack according to one embodiment of the present invention.

In one aspect of the present invention there is provided an equipment stand for storing police and/or military clothing and equipment. One embodiment of the stand comprises: a base; at least one upright extending upward from the base and having a lower end portion, a central portion, and an upper end portion; a belt hanger supported by at least one of said uprights and effective for holding an equipment belt; a vest hanger supported by at least one of said uprights and effective for holding an equipment vest; a tray supported by at least one of said uprights and effective for holding miscellaneous objects that do not need to be secured; and a lock box supported by at least one of said uprights and effective for holding miscellaneous objects that may need to be secured.

The upright may include a lower portion extending between the base and the tray, and an upper portion extending upward beyond the tray and having a lateral portion effective for holding one or more clothing hangers.

The belt hanger may comprise a rod extending laterally from said upright in a first direction, and a belt-supporting member supported by said rod.

The belt-supporting member may comprise a convex surface with a length of at least four inches and a width of at least four inches, and a sidewall member extending outward from at least one side of the convex surface.

The vest hanger may comprise a T-shaped rod extending laterally from said upright in a second direction, and a pair of vest-supporting members supported by said T-shaped rod.

Each of the pair of vest-supporting members may comprise comprises a convex surface with a length of at least four inches and a width of at least six inches.

In another embodiment the equipment rack comprises: a first equipment storage level comprising a belt hanger and a vest hanger; a second equipment storage level comprising a tray effective for holding miscellaneous objects that do not need to be secured and a lock box effective for holding miscellaneous objects that may need to be secured; and at least one upright extending between said first equipment storage level and said second equipment storage level; wherein said at least one upright includes mounting means adapted to facilitate mounting the equipment rack to a wall.

DESCRIPTION OF THE PREFERRED EMBODIMENTS

For the purposes of promoting an understanding of the principles of the invention, reference will now be made to certain embodiments and specific language will be used to describe the same. It will nevertheless be understood that no limitation of the scope of the invention is thereby intended, with such alterations and modifications to the illustrated device being contemplated as would normally occur to one skilled in the art to which the invention relates.

The present invention relates to an equipment rack for organizing and storing clothing, equipment, and accessory items, and more particularly to a rack for organizing and storing the clothing, equipment, and accessory items used by military and/or law enforcement personnel. The rack stores the clothing, equipment, and accessories in a manner consistent with the manner in which the items are usually donned and/or removed.

One preferred embodiment the equipment rack of the present invention comprises a base, an upright, a vest hanger for holding an equipment vest, a belt hanger for holding an equipment belt, a tray for holding miscellaneous objects that do not need to be secured, and a lock box for holding miscellaneous objects that may need to be secured. A hat or helmet holder may also be included.

1. The Belt Hanger.

Preferred embodiments of the present invention include a belt hanger. As shown in the drawings, the belt hanger may be connected to one or more uprights.

The belt hanger may comprise a rod extending laterally from an upright, and a belt-supporting member. The belt-supporting member may comprise a convex surface with a length and a width. The convex surface has two edges that are linear (straight and flat), and two edges that are curved (curbed downward to provide the convex shape). The distance between the two curved edges defines the width of the surface. The distance over the curved surface between the two linear surfaces defines the length of the surface. The length is preferably at least four inches, and the width is also preferably at least four inches.

In some embodiments the belt-supporting member comprises an upper convex surface and a lower concave surface. The upper convex surface contacts the belt being supported on the hanger, and the lower concave surface does not contact the belt being supported on the hanger.

In some embodiments the belt-supporting member comprises an upper convex surface and a lower flat surface. The upper convex surface contacts the belt being supported on the hanger, and the lower flat surface does not contact the belt being supported on the hanger.

The belt-supporting member preferably is not a rod. In embodiments where the belt-supporting member is a rod, the rod preferably has a diameter of at least four inches.

One or more sidewall members may extend outward (upward) along at least one side of the convex surface, and preferably extends outward/upward along both sides of the convex surface. The sidewall member(s) preferably extends ¼" to 1", and most preferably about ½", from the convex surface. The sidewall members keep a belt draped over the belt-hanger from sliding sideways off the convex surface.

The belt-contacting surface of the belt hanger is sized and shaped to allow an equipment belt to hang on the rack in a manner similar to the way that the belt would be on a person's body. This ergonomic shape helps keep the belt to maintain a good condition.

The belt-contacting surface of the belt hanger may be made of a nonslip material or may have a nonslip coating. The nonslip surface helps keep the belt properly positioned on the belt hanger, and thus reduces wear.

The curvature or the belt hanger, along with the nonslip coating, allows the equipment to hang as it does on the body preventing distortion, warping or damage compared to traditional hangers and valets.

2. The Vest Hanger.

Preferred embodiments of the present invention include a vest hanger. As shown in the drawings, the vest hanger may comprise a T-shaped rod extending laterally from an upright. The vest hanger may also comprise a pair of vest-supporting members supported by the T-shaped rod.

Each of the pair of vest-supporting members may comprise a convex surface. The convex surface of each vest-supporting member has two edges that are linear (straight and flat), and two edges that are curved (curbed downward to provide the convex shape). The distance between the two curved edges defines the width of the surface. The distance over the curved surface between the two linear surfaces defines the length of the surface. The length of each of the pair of vest-supporting members is preferably at least four inches. The width of each of the pair of vest-supporting members is preferably at least six inches.

In some embodiments the vest-supporting member comprises an upper convex surface and a lower concave surface. The upper convex surface contacts the vest being supported on the hanger, and the lower concave surface does not contact the vest being supported on the hanger.

In some embodiments the vest-supporting member comprises an upper convex surface and a lower flat surface. The upper convex surface contacts the vest being supported on the hanger, and the lower flat surface does not contact the vest being supported on the hanger.

The vest-supporting member preferably is not a rod. In embodiments where the vest-supporting member is a rod, the rod preferably has a diameter of at least four inches.

The vest-contacting surface of the vest hanger is sized and shaped to allow a vest to hang on the rack as it does on a person's body. This ergonomic shape helps keep the vest to maintain a good condition.

The vest-contacting surface of the vest hanger may be made of a nonslip material or may have a nonslip coating. The nonslip surface helps keep the vest properly positioned on the vest hanger, and thus reduces wear.

The curvature or the vest hanger, along with the nonslip coating, allows the equipment to hang as it does on the body preventing distortion, warping or damage compared to traditional hangers and valets.

3. The Storage Tray.

Preferred embodiments of the present invention include a storage tray. As shown in the drawings, the storage tray is effective for storing holding miscellaneous objects, like radios, phones, etc., that do not need to be secured.

The storage tray preferably comprises a generally flat, rectangular storage area, and sidewalls effective to retain small objects on the tray. In some embodiments the storage tray has a length of 6" to 12" and a width of 12" to 18".

4. The Lock Box.

Preferred embodiments of the present invention also include a lock box. As shown in the drawings, the lock box is effective for storing holding miscellaneous objects, like handguns, etc., that not need to be secured in a locked environment.

The lock box preferably comprises a generally rectangular, box-shaped storage area, and sidewalls effective to retain small objects on the tray. In some embodiments the lock box has a length of 6" to 12", a width of 12" to 18", and a depth of 3" to 6". A combination lock or a keyed lock may be used.

5. The Shepherd's Hook Extension.

Some embodiments of the present invention include an extension at the top of the stand to hold clothing hangers for hanging shirts, etc. The upper extension is referred to herein as a "Shepherd's Hook" extension because in some embodiments the extension may have the look of a shepherd's hook.

The Shepherd's hook extension may be made integral to the primary upright system, or it may be attached to the lower upright portion as an extension to the primary upright. In general terms though, the upright preferably includes a lower portion extending between the base and the tray, and an upper portion extending upward beyond the tray and having a lateral portion effective for holding one or more clothing hangers.

6. The Base-Supported Stand.

Some embodiments of the present invention are free-standing units supported by a base. Such units typically have at least one upright extending upward from the base, with the upright having a lower end portion, a central portion, and an upper end portion. The belt hanger is supported by the upright(s) at a first level, and the vest hanger is supported by the upright(s) at a second level which may be the same as the first level. The storage tray is supported by the upright(s) at a third level, and the lock box is supported by the upright(s) at a fourth level which may be the same as the third level.

7. The Wall-Mounted Unit.

In another embodiment the equipment rack comprises a first equipment storage level comprising a belt hanger and a vest hanger; and a second equipment storage level comprising a tray effective for holding miscellaneous objects that do not need to be secured and a lock box effective for holding miscellaneous objects that may need to be secured. At least one upright extends between the first equipment storage level and said second equipment storage level. The upright includes mounting means adapted to facilitate mounting the equipment rack to a wall.

8. The Embodiments Illustrated by the Drawings.

Referring now to FIG. 1, a preferred embodiment of an equipment rack is shown for organizing and storing a variety of clothing items and accessory items of the type commonly worn and used by law enforcement personnel, emergency personnel, and the like. The rack includes a base comprising base members 1 and 2, an upright 3, a vest hanger comprising T-shaped rod 5 and a pair of vest-supporting members 7 for holding an equipment vest, a belt hanger comprising rod 4 extending laterally from upright 3, and a belt-supporting member comprising convex surface 6.1, first side sidewall member 6.2, and second sidewall member 6.3. The illustrated rack also includes a tray 9 for holding miscellaneous objects that do not need to be secured, and a lock box 10 for holding miscellaneous objects that may need to be secured. Support arm 8 supports one or both of the tray 9 and the lock box 10.

Figure 2:
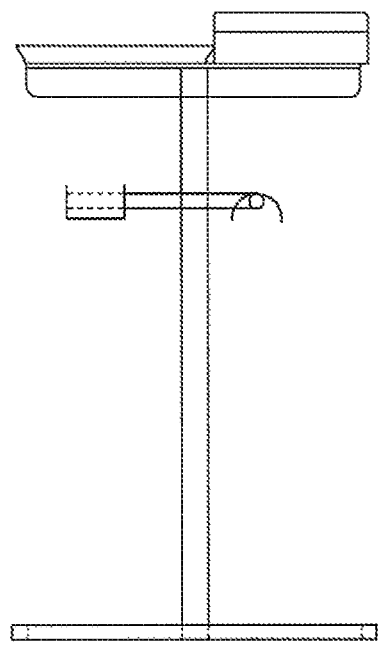
FIG. 2 shows an equipment rack according to one embodiment of present invention.

FIG. 2 shows an equipment rack according to one embodiment of present invention, showing the layout and certain dimensions of that embodiment.

Figure 3:
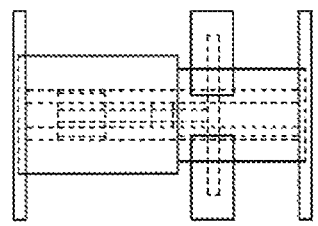
FIG. 3 shows a portion of an equipment rack according to one embodiment of present invention.

FIG. 3 shows a portion of an equipment rack according to one embodiment of present invention, showing the layout and certain dimensions of that portion.

Figure 4:
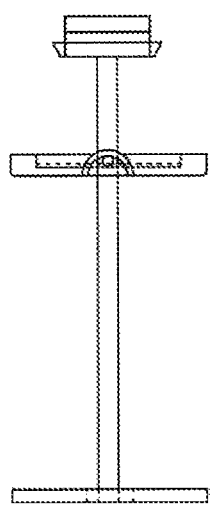
FIG. 4 shows an equipment rack according to one embodiment of present invention.

FIG. 4 shows an equipment rack according to one embodiment of present invention, showing the layout and certain dimensions of that embodiment.

Figure 5:
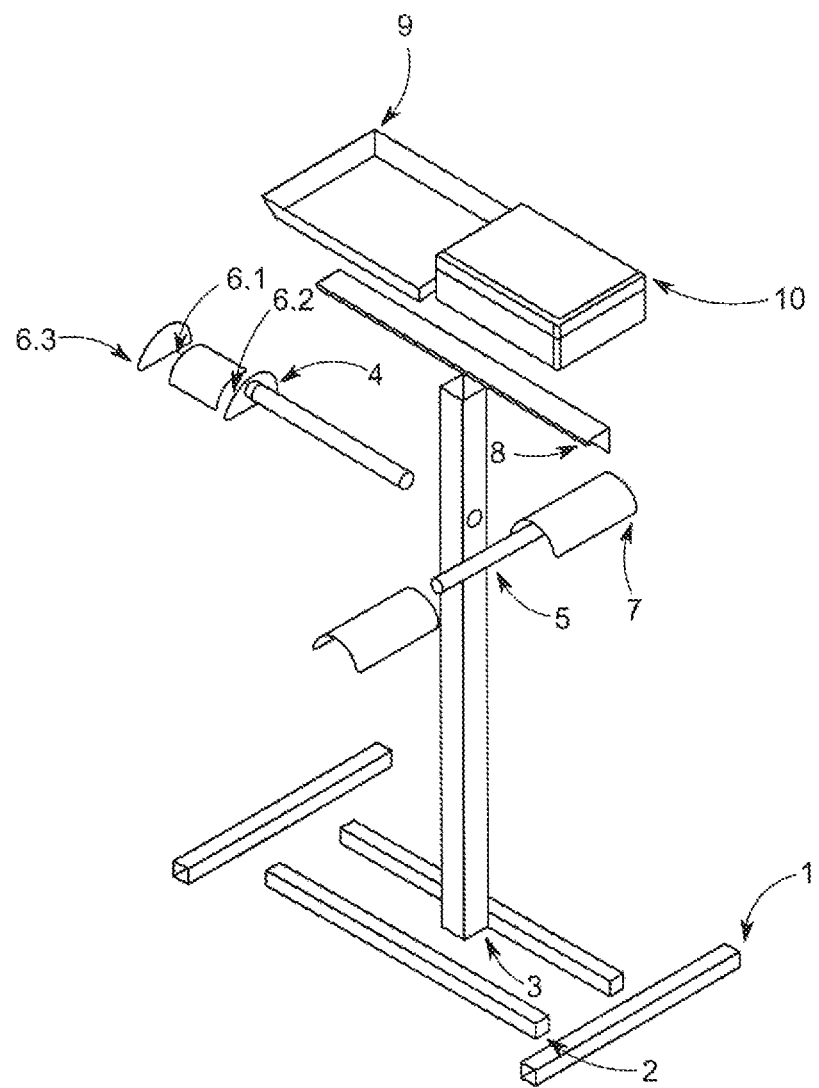
FIG. 5 shows an exploded view of certain portions of an equipment rack according to one embodiment of the present invention.

FIG. 5 shows an exploded view of certain portions of the equipment rack of FIG. 1. Similar reference numbers refer to similar parts of the rack.

Figure 6:
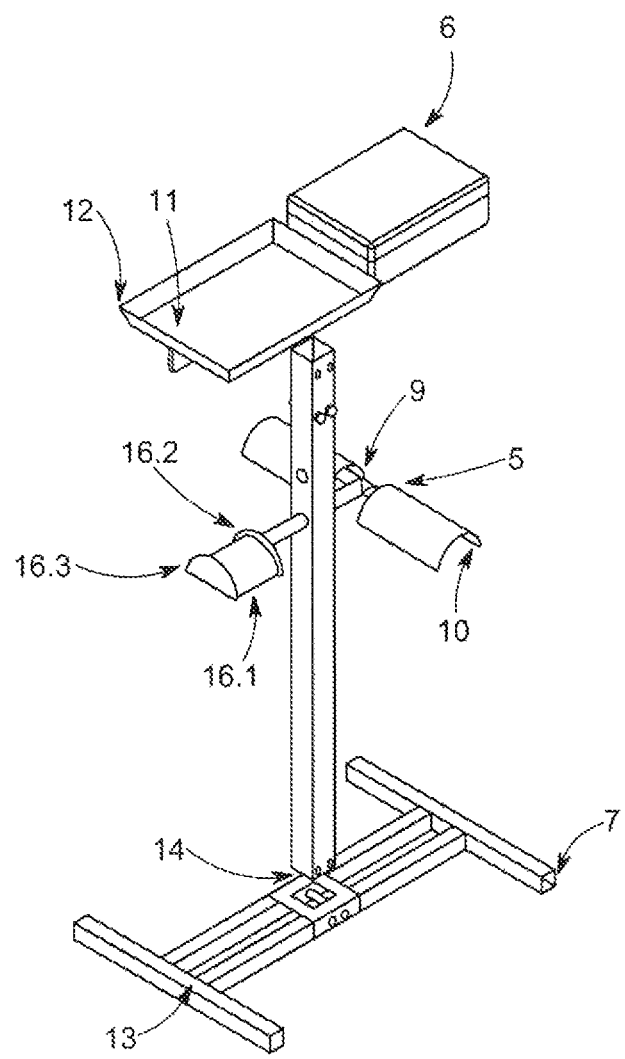
FIG. 6 shows a partially-exploded view of an equipment rack according to one embodiment of the present invention.
Figure 7:
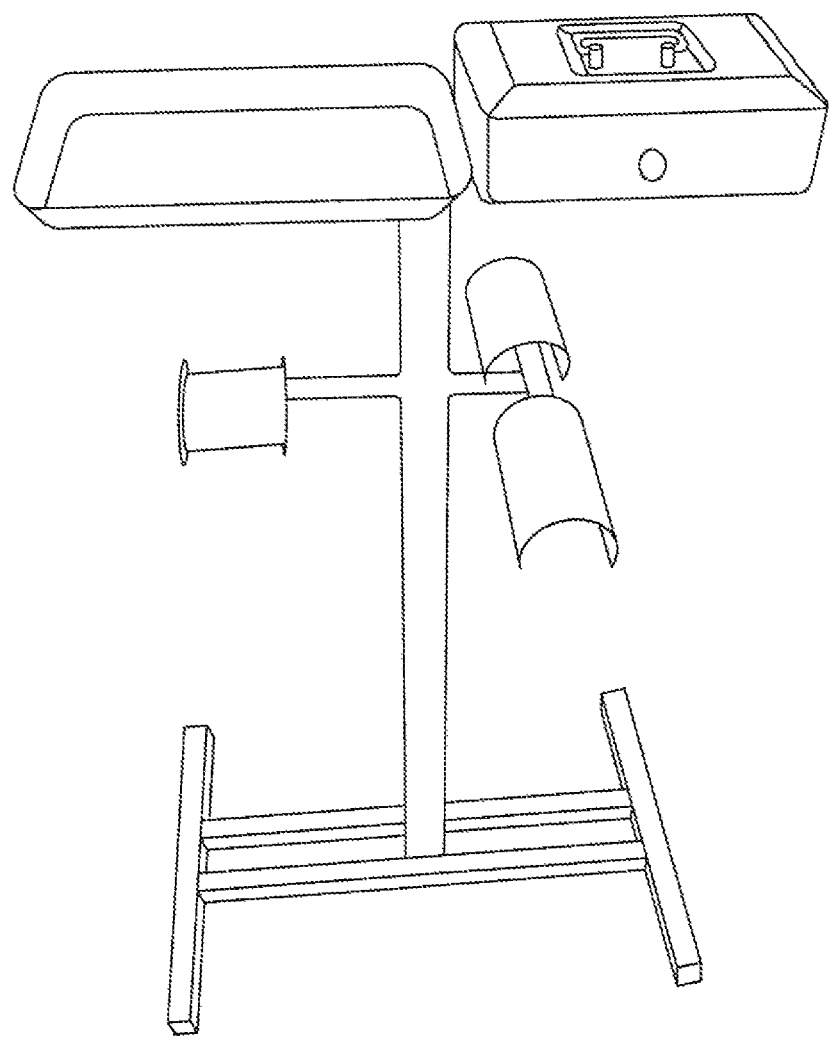
FIG. 7 shows an equipment rack according to another embodiment of the present invention.

FIG. 6 shows another, partially-exploded view of the equipment rack of FIG. 1. FIG. 7 shows an equipment rack according to another embodiment of the present invention.

Figure 8:
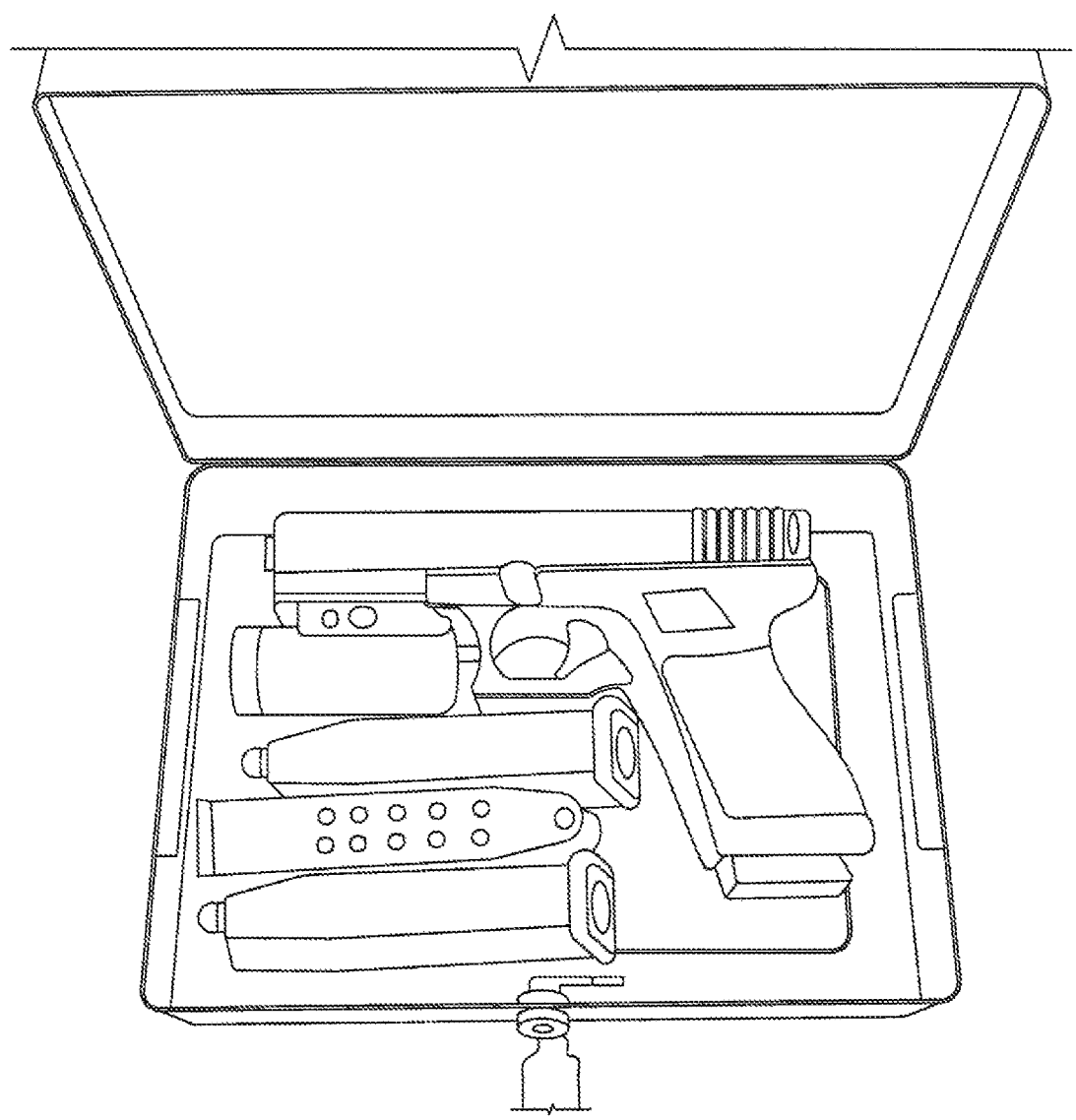
FIG. 8 shows a lockbox effective for holding miscellaneous objects that may need to be secured, according to one embodiment of the present invention.

FIG. 8 shows a lockbox effective for holding miscellaneous objects that may need to be secured, according to one embodiment of the present invention.

Figure 9:
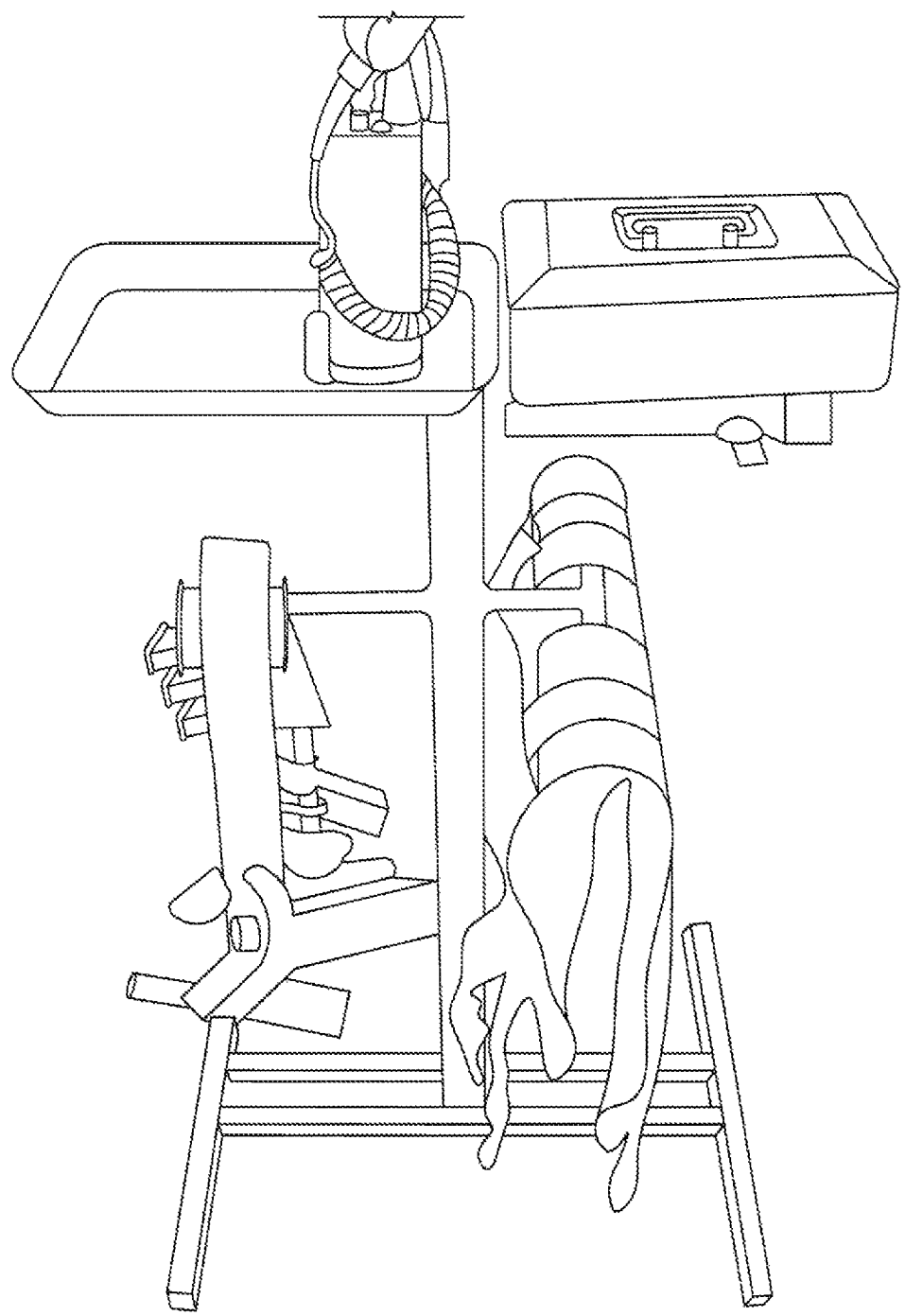
FIG. 9 shows an equipment rack according to another embodiment of the present invention, showing a belt, vest, and other equipment being stored on the rack.

FIG. 9 shows an equipment rack according to another embodiment of the present invention, showing a belt, vest, and other equipment being stored on the rack.

Figure 10:
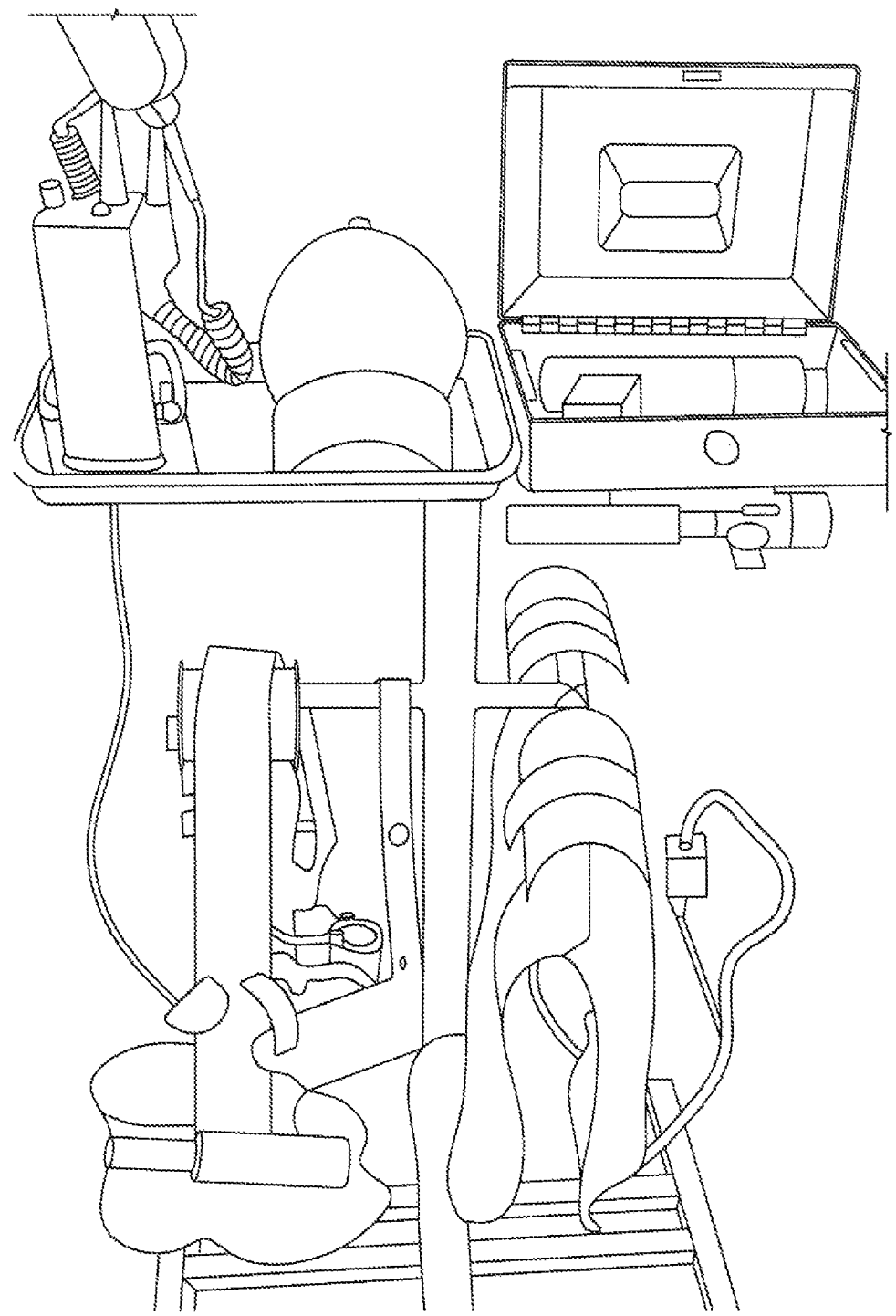
FIG. 10 shows an equipment rack according to another embodiment of the present invention, showing a belt, vest, and other equipment being stored on the rack.

FIG. 10 shows an equipment rack according to another embodiment of the present invention, showing a belt, vest, and other equipment being stored on the rack.

Figure 11A:
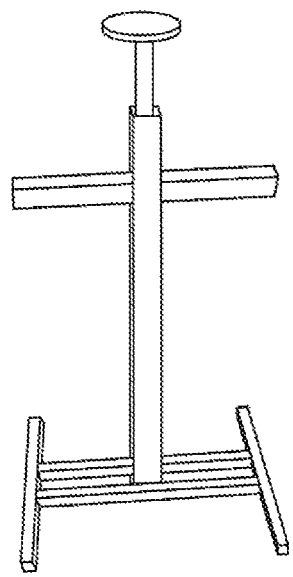
FIG. 11A shows an equipment rack according to another embodiment of the present invention.

FIG. 11A shows an equipment rack according to another embodiment of the present invention. The illustrated equipment rack is effective for organizing and storing a variety of clothing items and accessory items of the type commonly worn and used by military personnel and the like. The rack includes a base, an upright, a vest hanger for holding an equipment vest, and a helmet holder for holding a military helmet.

Figure 11B:
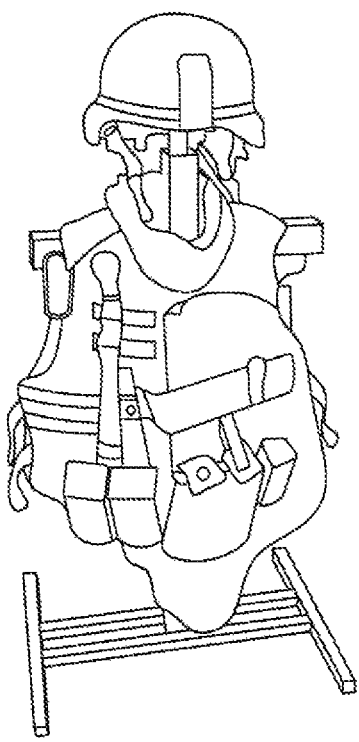
FIGS. 11B and 11C show the equipment rack of FIG. 11A, with a belt, vest, and other equipment being stored on the rack.
Figure 11C:
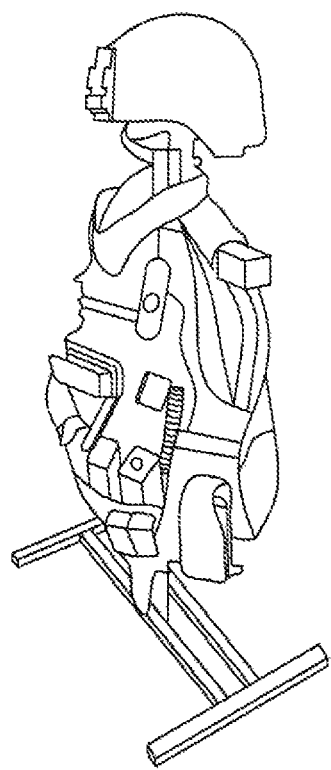

FIGS. 11B and 11C show the equipment rack of FIG. 11A, with a belt, vest, helmet, and other equipment being stored on the rack.

Figure 12:
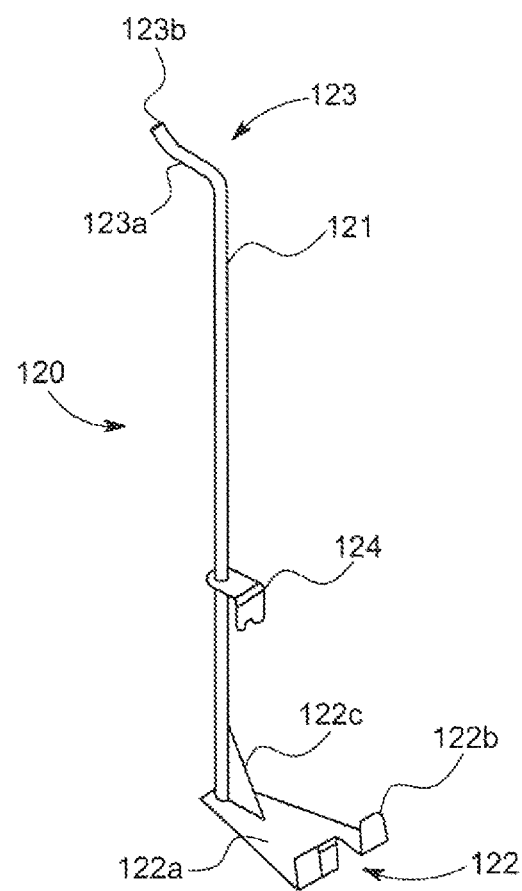
FIG. 12 shows an upright extension, or shepherd's hook, used in another embodiment of the present invention.

FIG. 12 shows an upright extension, or shepherd's hook, used in another embodiment of the present invention. Upright extension 120 comprises upright member 121, lower connection member 122, and upper hanger support 123. Lower connection member 122 comprises plate 122a and gripping members 122b. A brace 122c may be included to brace lower connection member 122 against upright 121. Upper hanger support 123 comprises horizontal hanger support 123a and upturned end 123b to keep hangers from sliding from the hanger.

Figure 13A:
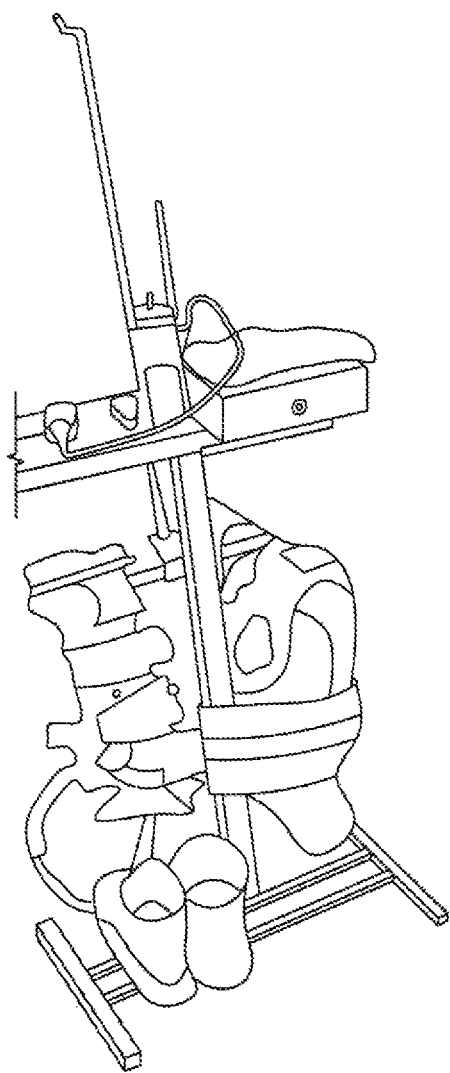
FIGS. 13A and 13B show an equipment rack according to another embodiment of the present invention, showing an upright extension, or shepherd's hook, positioned to support a clothing hanger and clothing.
Figure 13B:
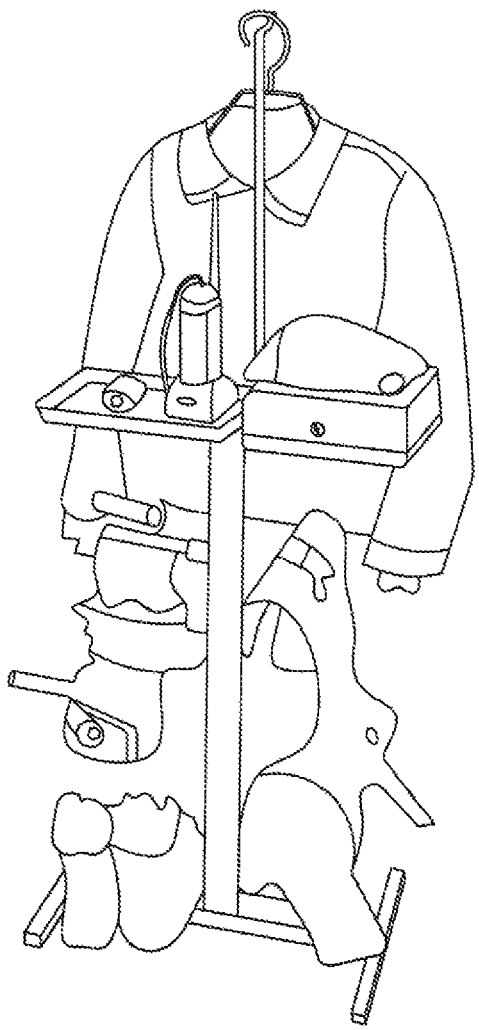

FIGS. 13A and 13B show an equipment rack according to another embodiment of the present invention, showing an upright extension, or shepherd's hook, positioned to support a clothing hanger and clothing.

Figure 14:
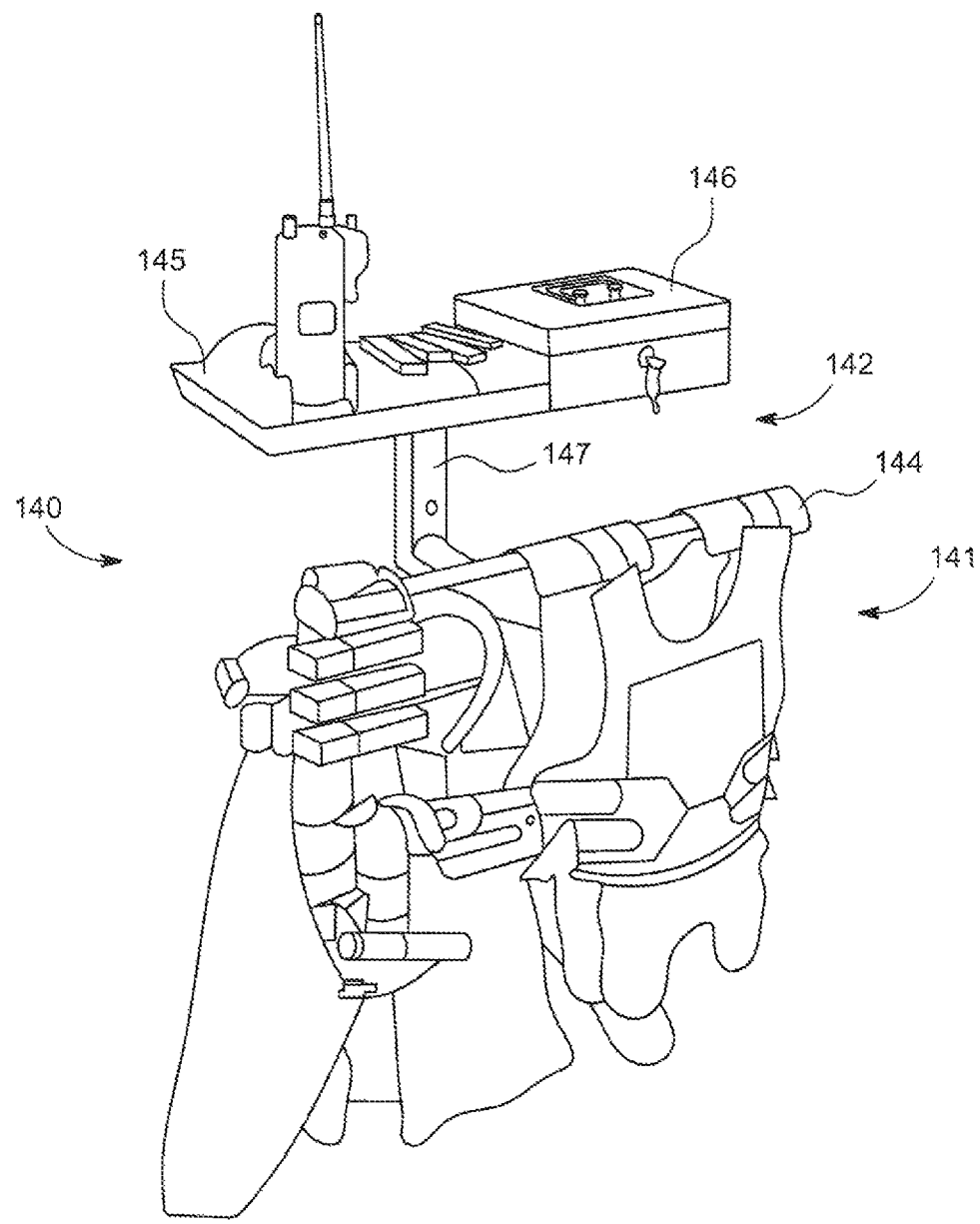
FIG. 14 shows an equipment rack according to another embodiment of the present invention, with the rack being mounted to a wall.

FIG. 14 shows an equipment rack according to another embodiment of the present invention, with the rack being mounted to a wall. Equipment rack 140 comprises first equipment storage level 141 and second equipment level 142. First equipment level 141 comprises belt hanger 143 and vest hanger 144. Second equipment storage level 142 comprises tray 145 effective for holding miscellaneous objects that do not need to be secured, and lock box 146 effective for holding miscellaneous objects that may need to be secured. Rack 140 also includes at least one upright 147 extending between first equipment storage level 141 and second equipment storage level 142. Upright 147 includes mounting means adapted to facilitate mounting the equipment rack to a wall. For example, the mounting means may be holes in upright 147 adapted to receive bolts.

Figure 15:
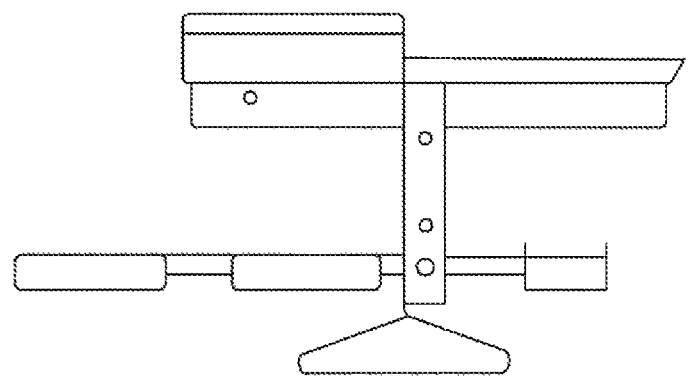
FIG. 15 shows an equipment rack according to one embodiment of present invention, showing the layout and certain dimensions of that embodiment.

FIG. 15 shows an equipment rack according to one embodiment of present invention, showing the layout and certain dimensions of that embodiment.

Figure 16:
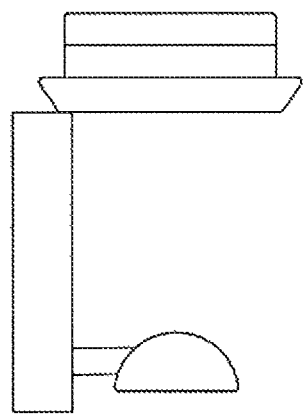
FIG. 16 shows an equipment rack according to one embodiment of present invention, showing the layout and certain dimensions of that embodiment.

FIG. 16 shows an equipment rack according to one embodiment of present invention, showing the layout and certain dimensions of that embodiment.

The equipment racks of the present invention are preferably 100% steel construction, and are sturdy enough to support the heavy equipment typically used by military and/or police personnel. The base provides a wide stance to prevent knock-over.

While the invention has been illustrated and described in detail in the drawings and foregoing description, the same is to be considered as illustrative and not restrictive in character, it being understood that only certain preferred embodiments have been shown and described, and that all changes and modifications that come within the spirit of the invention are desired to be protected.

Additionally, it is to be appreciated that the present invention may comprise or consist essentially of any or all of the described or illustrated elements. Further, any or all of the features, elements, and/or embodiments disclosed herein may be combined with any or all of the other features, elements, and/or embodiments disclosed herein to provide an invention that comprises or consists essentially of such features, elements, and/or embodiments.

The grammatical device "and/or" (such as in "A and/or B") is used in this disclosure to mean A alone, or B alone, or both A and B.

The invention claimed is:

1. An equipment stand comprising:

a base;

at least one upright extending upward from the base and having a lower end portion, a central portion, and an upper end portion;

a belt hanger supported by the at least one upright and effective for holding an equipment belt, wherein said belt hanger comprises a convex surface bounded by two linear edges and two curved edges, and having a length of at least four inches and a width of at least four inches, and further comprising a first sidewall member extending outward from one side of the convex surface along a first curved edge of the two curved edges, and a second sidewall member extending outward from another side of the convex surface along a second curved edge of the two curved edges, wherein said sidewalls are effective to keep a belt draped over the belt-hanger from sliding sideways off the convex surface;

a vest hanger supported by the at least one upright and effective for holding an equipment vest, wherein said vest hanger comprises a T-shaped rod extending laterally from said upright, and a pair of vest-supporting members supported by said T-shaped rod, wherein each of said pair of vest-supporting members comprises a convex surface with a length of at least four inches and a width of at least six inches;

a tray supported by the at least one upright and effective for holding miscellaneous objects that do not need to be secured; and a lock box supported by the at least one upright and effective for holding miscellaneous objects that may need to be secured.

2. The equipment of claim 1 wherein the lower end portion of said upright extending between the base and the tray, and the upper end portion extending upward beyond the tray and having a lateral portion effective for holding one or more clothing hangers.

3. The equipment rack of claim 1 wherein said belt hanger comprises a rod extending laterally from said upright in a first direction, and a belt-supporting member supported by said rod.

* * * * *